US011893349B2

(12) United States Patent
Gupta et al.

(10) Patent No.: US 11,893,349 B2
(45) Date of Patent: Feb. 6, 2024

(54) SYSTEMS AND METHODS FOR GENERATING LOCALE-SPECIFIC PHONETIC SPELLING VARIATIONS

(71) Applicant: GOOGLE LLC, Mountain View, CA (US)

(72) Inventors: Abhirut Gupta, Bangalore (IN); Aravindan Raghuveer, Chennai (IN); Abhay Sharma, Bangalore (IN); Nitin Raut, Mountain View, CA (US); Manish Kumar, Bangalore (IN)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/716,430

(22) Filed: Apr. 8, 2022

(65) Prior Publication Data

US 2022/0391588 A1     Dec. 8, 2022

(30) Foreign Application Priority Data

Jun. 4, 2021   (IN) .............................. 202141024922

(51) Int. Cl.
*G06F 40/232*   (2020.01)
*G10L 15/187*   (2013.01)
(Continued)

(52) U.S. Cl.
CPC .......... *G06F 40/284* (2020.01); *G06F 40/232* (2020.01); *G06F 40/242* (2020.01);
(Continued)

(58) Field of Classification Search
CPC ................. G06F 40/232; G10L 15/187; G10L 2015/025
See application file for complete search history.

(56) References Cited

U.S. PATENT DOCUMENTS 6,961,695 B2 * 11/2005 Lawrence ............. G06F 40/232
                                                                  704/7
7,277,851 B1 * 10/2007 Henton ................. G10L 15/187
                                                                  704/235

(Continued)

FOREIGN PATENT DOCUMENTS

CN       113393830 A   *   9/2021
CN       114495910 A   *   5/2022
CN       115512689 A   *  12/2022

OTHER PUBLICATIONS

Rahul Bhagat and Eduard Hovy. 2007. Phonetic models for generating spelling variants. In Proceedings of the 20th international joint conference on Artifical intelligence (IJCAI'07). Morgan Kaufmann Publishers Inc., San Francisco, CA, USA, 1570-1575. (Year: 2007).*

(Continued)

*Primary Examiner* — Benjamin Smith
(74) *Attorney, Agent, or Firm* — Botos Churchill IP Law LLP (57) ABSTRACT

Systems and methods for generating phonetic spelling variations of a given word based on locale-specific pronunciations. A phoneme-letter density model may be configured to identify a phoneme sequence corresponding to an input word, and to identify all character sequences that may correspond to an input phoneme sequence and their respective probabilities. The phoneme-phoneme error model may be configured to identify locale-specific alternative phoneme sequences that may correspond to a given phoneme sequence, and their respective probabilities. Using these two models, a processing system may be configured to generate, for a given input word, a list of alternative character sequences that may correspond to the input word based on locale-specific pronunciations, and/or a probability distribution representing how likely each alternative character sequence is to correspond to the input word.

16 Claims, 7 Drawing Sheets

(51) Int. Cl.
*G06F 40/284* (2020.01)
*G06F 40/242* (2020.01)
*G10L 13/08* (2013.01)
*G10L 15/02* (2006.01)
*G10L 15/06* (2013.01)

(52) U.S. Cl.
CPC ............ *G10L 13/08* (2013.01); *G10L 15/187* (2013.01); *G10L 15/063* (2013.01); *G10L 2015/025* (2013.01)

(56) References Cited

U.S. PATENT DOCUMENTS

| | | | | |
|---|---|---|---|---|
| 7,912,716 | B2* | 3/2011 | McCuller | G10L 15/187 704/254 |
| 8,751,235 | B2* | 6/2014 | Mori | G10L 13/08 704/258 |
| 8,881,004 | B2* | 11/2014 | Fux | G06F 40/232 715/257 |
| 9,164,983 | B2* | 10/2015 | Liu | G06F 40/126 |
| 9,275,633 | B2* | 3/2016 | Cath | G10L 13/08 |
| 9,582,489 | B2* | 2/2017 | McAteer | G06F 40/232 |
| 10,095,683 | B2* | 10/2018 | Hegerty | G06Q 50/01 |
| 10,147,417 | B2* | 12/2018 | Lin | G10L 15/22 |
| 10,255,905 | B2* | 4/2019 | Chua | G10L 13/047 |
| 10,403,265 | B2* | 9/2019 | Maruta | G10L 15/187 |
| 10,521,511 | B2* | 12/2019 | Stephen | G06F 40/126 |
| 10,796,105 | B2* | 10/2020 | Tarakji | G06F 40/157 |
| 11,068,659 | B2* | 7/2021 | Cutting | G06F 40/232 |
| 11,145,293 | B2* | 10/2021 | Prabhavalkar | G10L 15/02 |
| 11,217,231 | B2* | 1/2022 | Prabhavalkar | G10L 19/04 |
| 11,270,687 | B2* | 3/2022 | Hu | G10L 15/063 |
| 11,295,730 | B1* | 4/2022 | Mohajer | G10L 15/1822 |
| 11,335,333 | B2* | 5/2022 | Han | G10L 15/22 |
| 11,410,642 | B2* | 8/2022 | Scuderi | G10L 15/04 |
| 11,430,425 | B2* | 8/2022 | Patel | G10L 13/086 |
| 11,645,478 | B2* | 5/2023 | Tambi | G06F 40/56 704/2 |
| 2003/0049588 | A1 | 3/2003 | Lawrence | G06F 40/232 434/167 |
| 2007/0005567 | A1* | 1/2007 | Hermansen | G06F 16/90344 707/E17.061 |
| 2007/0016422 | A1* | 1/2007 | Mori | G10L 13/08 704/E13.011 |
| 2007/0083369 | A1* | 4/2007 | McCuller | G10L 15/187 704/E15.02 |
| 2007/0150279 | A1* | 6/2007 | Gandhi | G10L 13/08 704/258 |
| 2008/0244386 | A1* | 10/2008 | Fux | G06F 40/232 715/257 |
| 2008/0244387 | A1* | 10/2008 | Fux | G06F 40/232 715/257 |
| 2010/0030561 | A1* | 2/2010 | Mori | G10L 13/08 704/260 |
| 2011/0119051 | A1* | 5/2011 | Li | G10L 15/187 704/E15.02 |
| 2011/0184723 | A1 | 7/2011 | Huang et al. | |
| 2013/0173258 | A1* | 7/2013 | Liu | G06F 40/40 704/9 |
| 2013/0179170 | A1* | 7/2013 | Cath | G10L 13/08 704/260 |
| 2013/0253903 | A1* | 9/2013 | Stephen | G06F 40/58 704/9 |
| 2016/0179774 | A1* | 6/2016 | McAteer | G06F 40/232 704/9 |
| 2016/0299882 | A1* | 10/2016 | Hegerty | G06F 40/232 |
| 2017/0358293 | A1* | 12/2017 | Chua | G10L 15/16 |
| 2018/0096679 | A1* | 4/2018 | Lin | G10L 15/22 |
| 2018/0190269 | A1* | 7/2018 | Lokeswarappa | G09B 19/06 |
| 2018/0240455 | A1* | 8/2018 | Maruta | G10L 15/187 |
| 2018/0293228 | A1* | 10/2018 | Tarakji | G06F 40/157 |
| 2018/0341641 | A1* | 11/2018 | Cutting | G06F 40/232 |
| 2020/0027444 | A1* | 1/2020 | Prabhavalkar | G10L 15/16 |
| 2020/0126538 | A1* | 4/2020 | Han | G10L 15/063 |
| 2020/0342851 | A1* | 10/2020 | Patel | G10L 13/047 |
| 2020/0349923 | A1* | 11/2020 | Hu | G10L 15/193 |
| 2020/0357388 | A1* | 11/2020 | Zhao | G06N 20/00 |
| 2020/0402501 | A1* | 12/2020 | Prabhavalkar | G10L 19/04 |
| 2021/0049927 | A1* | 2/2021 | Saha | G10L 15/187 |
| 2021/0050004 | A1* | 2/2021 | Whiting | G10L 15/005 |
| 2021/0183361 | A1* | 6/2021 | Silverzweig | G10L 13/04 |
| 2022/0067283 | A1* | 3/2022 | Bellegarda | G06N 20/00 |
| 2022/0138439 | A1* | 5/2022 | Tambi | G06F 40/117 704/2 |
| 2022/0386902 | A1* | 12/2022 | Vanpoucke | A61B 5/123 |
| 2022/0415305 | A1* | 12/2022 | Patel | G10L 13/08 |

OTHER PUBLICATIONS

Karanasou, P., Lamel, L. (2010). Comparing SMT Methods for Automatic Generation of Pronunciation Variants. Advances in Natural Language Processing. NLP 2010. Lecture Notes in Computer Science(), vol. 6233. pp. 167-178. https://doi.org/10.1007/978-3-642-14770-8_20 (Year: 2010).*

Bartkova, Katarina. "Generating proper name pronunciation variants for automatic speech recognition." Proc. of ICPhS. 2003. 4 pages; https://www.internationalphoneticassociation.org/icphs-proceedings/ICPhS2003/papers/p15_1321.pdf (Year: 2003).*

International Search Report and Written Opinion for Application No. PCT/US21/43739 dated Mar. 4, 2022 (14 pages).

Li, Chen , et al., "Normalization of text messages using character- and phone-based machine translation approaches", INTERSPEECH 2012, XP055892261, ISCA., Jan. 1, 2012, pp. 2330-2333.

* cited by examiner

Access a phoneme dictionary containing pronunciations for a plurality of words

304

Train the phoneme-letter density model to recognize alignments between characters and phonemes based on the associations between a set of words in the phoneme dictionary and their respective phoneme sequences

306

For each given word in the phoneme dictionary, train the phoneme-letter density model to map each grapheme of the given word to one of the phonemes of the corresponding phoneme sequence

308

Calculate, for each given phoneme in the phoneme dictionary, the likelihood that the given phoneme will correspond to each grapheme mapped to it in step 306

702
Perform method 600 of FIG. 6, including the generation of third likelihood values for each substitute phoneme of each of the one or more substitute phoneme sequences, and first likelihood values for each grapheme of each of the one or more character sequences

704
For each given character sequence generated in step 606, generate a second likelihood that the given character sequence may correspond to each given substitute phoneme sequence generated in step 604

706
For each given substitute phoneme sequence generated in step 604, generate a fourth likelihood that the given substitute phoneme sequence may correspond to the first phoneme sequence

708
Generate, based on the second likelihood values generated in step 704 and the fourth likelihood values generated in step 706, a probability distribution representing how likely each of the character sequences identified in step 606 is to correspond to the given input word

SYSTEMS AND METHODS FOR GENERATING LOCALE-SPECIFIC PHONETIC SPELLING VARIATIONS

CROSS-REFERENCE TO RELATED APPLICATIONS

This application claims priority to provisional Indian Patent Application No. 202141024922, filed Jun. 4, 2021, which is hereby incorporated by reference in its entirety.

BACKGROUND

Various applications that process written or spoken language (e.g., word processing applications, search engines, speech recognition, automated assistants, natural language processing models) can benefit from being aware of the potential alternative spellings and misspellings, and alternative pronunciations that may correspond to a given word. For example, a word processing application may be configured to check text against a dictionary and a database of known misspellings, and replace any commonly misspelled words (e.g., "teh") with the most likely correction (e.g., "the"). Although this may work well in certain contexts, a database of common misspellings may nevertheless fail to reflect regional variations in pronunciation which may change how certain words are pronounced and spelled (or misspelled). As a result, a system reliant on a database that only reflects common misspellings may be unable to automatically choose the correct replacement for words that are influenced by such regional pronunciations, and/or may be unable to identify sensible replacements. Moreover, such challenges may be magnified where the application relies on speech recognition (or speech-to-text) to convert a spoken input to text, as pronunciation variations may impact a much larger percentage of the input than if the user were typing.

BRIEF SUMMARY

The present technology concerns systems and methods for generating phonetic spelling variations of a given word based on locale-specific pronunciations. In that regard, the present technology may utilize both a phoneme-letter density model and a phoneme-phoneme error model. The phoneme-letter density model may be configured to identify a phoneme sequence corresponding to an input word, and to identify all character sequences that may correspond to an input phoneme sequence and their respective probabilities. The phoneme-phoneme error model may be configured to identify locale-specific alternative phoneme sequences that may correspond to a given phoneme sequence, and their respective probabilities. For example, in a locale where an "s" may alternatively be pronounced with a "j" sound, and thus the word "design" might be pronounced as "dijin," the phoneme-phoneme error model may be configured to identify the phoneme sequence for "dijin" (e.g., "/D/ /IH0/ /JH/ /AY1/ /N/") as a locale-specific alternative to the phoneme sequence for "design" (e.g., "/D/ /IH0/ /Z/ /AY1/ /N/"), and its likelihood of being used. As explained further below, using these two models, a processing system can be configured to generate, for a given input word, a list of alternative character sequences that may correspond to the input word based on locale-specific pronunciations, and/or a probability distribution representing how likely each alternative character sequence is to correspond to the input word.

In one aspect, the disclosure describes a computer-implemented method of generating alternative spellings of a given word, comprising: determining, by one or more processors of a processing system, a first phoneme sequence corresponding to the given word, the first phoneme sequence comprising a plurality of phonemes representing a first pronunciation of the given word; identifying, by the one or more processors, one or more substitute phonemes that may be used in place of one or more phonemes of the first phoneme sequence; generating, by the one or more processors, one or more substitute phoneme sequences based on the first phoneme sequence and the identified one or more substitute phonemes; and for each given substitute phoneme sequence of the one or more substitute phoneme sequences, generating a given alternative spelling of the given word, comprising: identifying, by the one or more processors, one or more graphemes that may correspond to each given phoneme of the given substitute phoneme sequence; and combining, by the one or more processors, each of the identified one or more graphemes to form the given alternative spelling. In some aspects, determining the first phoneme sequence corresponding to the given word is based on a phoneme-letter density model. In some aspects, determining the first phoneme sequence corresponding to the given word is based on a phoneme dictionary. In some aspects, identifying the one or more substitute phonemes that may be used in place of one or more phonemes of the first phoneme sequence is based on a phoneme-phoneme error model. In some aspects, identifying the one or more graphemes that may correspond to each given phoneme of the given substitute phoneme sequence is based on a phoneme-letter density model. In some aspects, identifying, by the one or more processors, one or more graphemes that may correspond to each given phoneme of the given substitute phoneme sequence further comprises identifying a first likelihood value representing a likelihood that the one or more graphemes may correspond to the given phoneme. In some aspects, combining, by the one or more processors, each of the identified one or more graphemes to form the given alternative spelling further comprises generating a second likelihood value for the given alternative spelling based on the identified first likelihood values for each of the identified one or more graphemes, the second likelihood value representing a likelihood that the given alternative spelling may correspond to the first phoneme sequence. In some aspects, the method further comprises identifying, by the one or more processors, a third likelihood value for each of the identified one or more substitute phonemes representing a likelihood that each of the identified one or more substitute phonemes may be used in place of a phoneme of the first phoneme sequence. In some aspects, the method further comprises generating, by the one or more processors, a fourth likelihood value for each given substitute phoneme sequence of the one or more substitute phoneme sequences based on the identified third likelihood values for each identified substitute phoneme included in the given substitute phoneme sequence, the fourth likelihood value representing a likelihood that the given substitute phoneme sequence may correspond to the first phoneme sequence. In some aspects, the method further comprises generating, by the one or more processors, a probability distribution representing how likely each generated alternative spelling is to correspond to the given word based on the second likelihood values and the fourth likelihood values.

In another aspect, the disclosure describes a system for generating alternative spellings of a given word, comprising a memory and one or more processors coupled to the memory and configured to: determine a first phoneme sequence corresponding to the given word, the first phoneme sequence comprising a plurality of phonemes representing a first pronunciation of the given word; identify one or more substitute phonemes that may be used in place of one or more phonemes of the first phoneme sequence; generate one or more substitute phoneme sequences based on the first phoneme sequence and the identified one or more substitute phonemes; and for each given substitute phoneme sequence of the one or more substitute phoneme sequences, generate a given alternative spelling of the given word, comprising: identifying one or more graphemes that may correspond to each given phoneme of the given substitute phoneme sequence; and combining each of the identified one or more graphemes to form the given alternative spelling. In some aspects, the one or more processors are further configured to determine the first phoneme sequence corresponding to the given word based on a phoneme-letter density model. In some aspects, the one or more processors are further configured to determine the first phoneme sequence corresponding to the given word based on a phoneme dictionary. In some aspects, the one or more processors are further configured to identify the one or more substitute phonemes that may be used in place of one or more phonemes of the first phoneme sequence based on a phoneme-phoneme error model. In some aspects, the one or more processors are further configured to identify the one or more graphemes that may correspond to each given phoneme of the given substitute phoneme sequence based on a phoneme-letter density model. In some aspects, identifying one or more graphemes that may correspond to each given phoneme of the given substitute phoneme sequence further comprises identifying a first likelihood value representing a likelihood that the one or more graphemes may correspond to the given phoneme. In some aspects, combining each of the identified one or more graphemes to form the given alternative spelling further comprises generating a second likelihood value for the given alternative spelling based on the identified first likelihood values for each of the identified one or more graphemes, the second likelihood value representing a likelihood that the given alternative spelling may correspond to the first phoneme sequence. In some aspects, the one or more processors are further configured to identify a third likelihood value for each of the identified one or more substitute phonemes representing a likelihood that each of the identified one or more substitute phonemes may be used in place of a phoneme of the first phoneme sequence. In some aspects, the one or more processors are further configured to generate a fourth likelihood value for each given substitute phoneme sequence of the one or more substitute phoneme sequences based on the identified third likelihood values for each identified substitute phoneme included in the given substitute phoneme sequence, the fourth likelihood value representing a likelihood that the given substitute phoneme sequence may correspond to the first phoneme sequence. In some aspects, the one or more processors are further configured to generate a probability distribution representing how likely each generated alternative spelling is to correspond to the given word based on the second likelihood values and the fourth likelihood values.

DETAILED DESCRIPTION

The present technology will now be described with respect to the following exemplary systems and methods.

Example Systems

Figure 1:
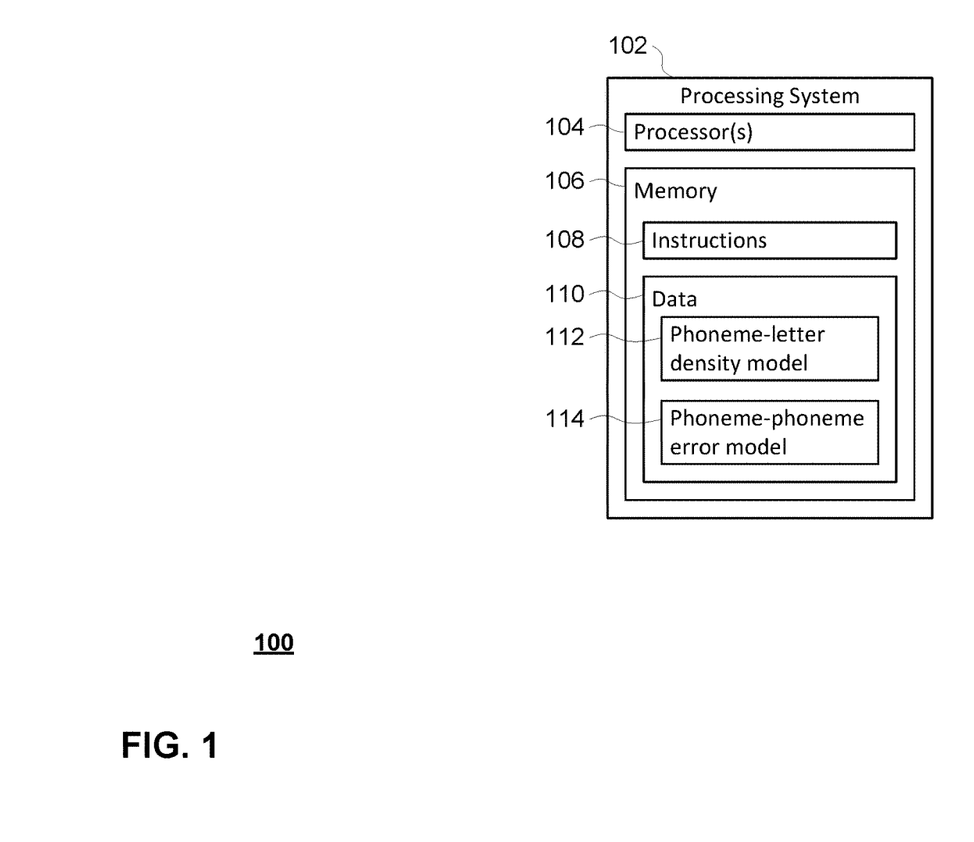
FIG. 1 is a functional diagram of an example system in accordance with aspects of the disclosure.

A high-level system diagram 100 of an exemplary processing system for performing the methods described herein is shown in FIG. 1. The processing system 102 may include one or more processors 104 and memory 106 storing instructions 108 and data 110. In the exemplary processing system 102 of FIG. 1, data 110 includes the phoneme-letter density model 112 and the phoneme-phoneme error model 114, described further below. Processing system 102 may be resident on a single computing device. For example, processing system 102 may be a server, personal computer, or mobile device, and the models described herein may thus be local to that single computing device. Similarly, processing system 102 may be resident on a cloud computing system or other distributed system, such that one or more of the models described herein are distributed across two or more different physical computing devices.

Figure 2:
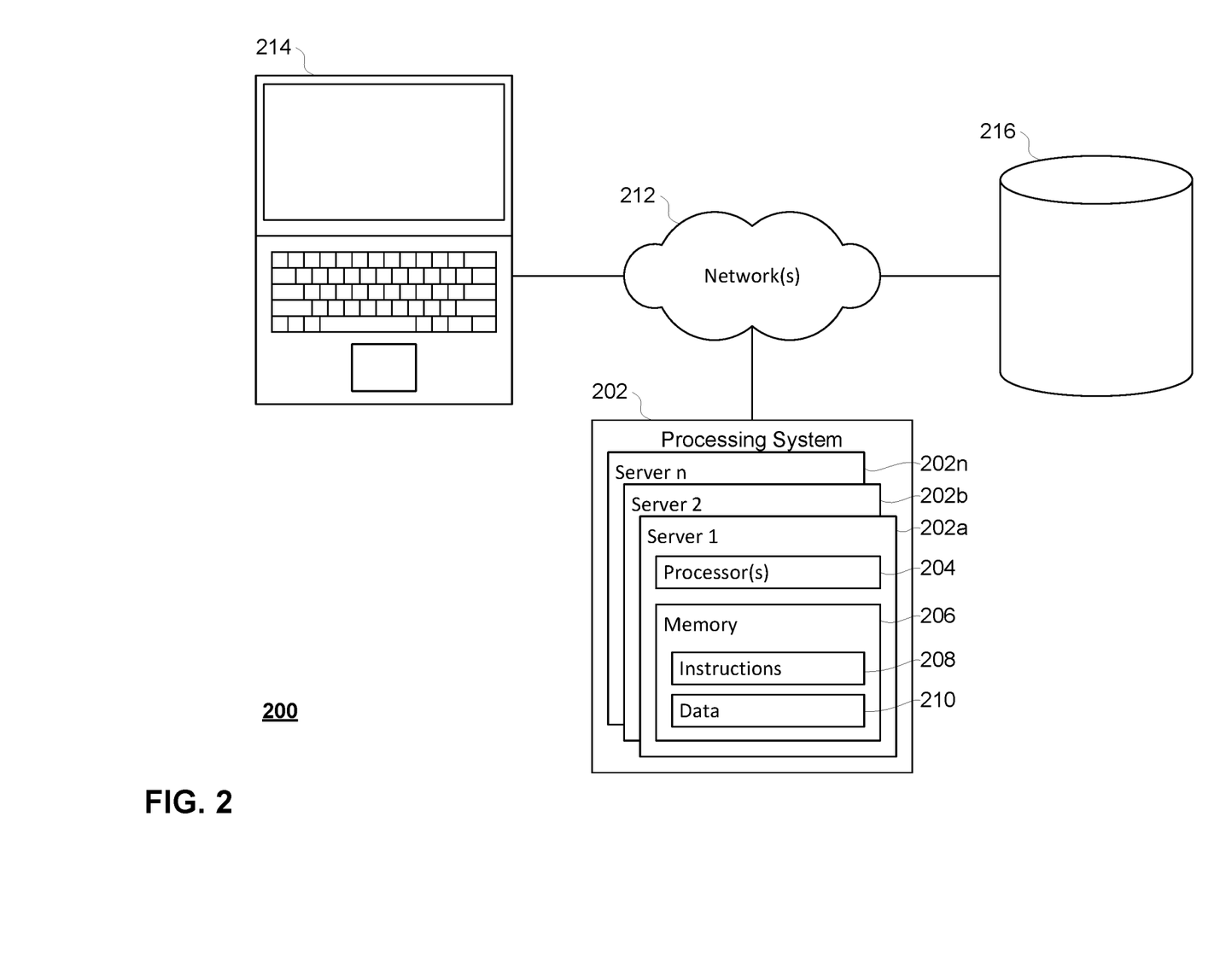
FIG. 2 is a functional diagram of an example system in accordance with aspects of the disclosure.

In this regard, FIG. 2 shows an additional high-level system diagram 200 in which an exemplary processing system 202 for performing the methods described herein is shown as a set of n servers 202a-202n, each of which includes one or more processors 204 and memory 206 storing instructions 208 and data 210. In addition, in the example of FIG. 2, the processing system 202 is shown in communication with one or more networks 212, through which it may communicate with one or more other computing devices. For example, the one or more networks 212 may allow a user to interact with processing system 202 using a personal computing device 214, which is shown as a laptop computer, but may take any known form including a desktop computer, tablet, smart phone, etc. Likewise, the one or more networks 212 may allow processing system 202 to communicate with one or more remote databases such as database 216. In some aspects of the technology, the phoneme-letter density model and/or the phoneme-phoneme error model described herein may be stored in memory 210 of one or more of servers 202a-202n. Likewise, in some aspects, the phoneme-letter density model and/or the phoneme-phoneme error model described herein may be stored in database 216, such that database 216 and processing system 202 form a distributed processing system for practicing the methods described below.

The processing systems described herein may be implemented on any type of computing device(s), such as any type of general computing device, server, or set thereof, and may further include other components typically present in general purpose computing devices or servers. Memory 106, 206 stores information accessible by the one or more processors 104, 204, including instructions 108, 208 and data 110, 210 that may be executed or otherwise used by the processor(s) 104, 204. Memory 106, 206 may be of any non-transitory type capable of storing information accessible by the processor(s) 104, 204. For instance, memory 106, 206 may include a non-transitory medium such as a hard-drive, memory card, optical disk, solid-state, tape memory, or the like. Computing devices suitable for the roles described herein may include different combinations of the foregoing, whereby different portions of the instructions and data are stored on different types of media.

In all cases, the computing devices described herein may further include any other components normally used in connection with a computing device such as a user interface subsystem. The user interface subsystem may include one or more user inputs (e.g., a mouse, keyboard, touch screen and/or microphone) and one or more electronic displays (e.g., a monitor having a screen or any other electrical device that is operable to display information). Output devices besides an electronic display, such as speakers, lights, and vibrating, pulsing, or haptic elements, may also be included in the computing devices described herein.

The one or more processors included in each computing device may be any conventional processors, such as commercially available central processing units ("CPUs"), graphics processing units ("GPUs"), tensor processing units ("TPUs"), etc. Alternatively, the one or more processors may be a dedicated device such as an ASIC or other hardware-based processor. Each processor may have multiple cores that are able to operate in parallel. The processor(s), memory, and other elements of a single computing device may be stored within a single physical housing, or may be distributed between two or more housings. Similarly, the memory of a computing device may include a hard drive or other storage media located in a housing different from that of the processor(s), such as in an external database or networked storage device. Accordingly, references to a processor or computing device will be understood to include references to a collection of processors or computing devices or memories that may or may not operate in parallel, as well as one or more servers of a load-balanced server farm or cloud-based system.

The computing devices described herein may store instructions capable of being executed directly (such as machine code) or indirectly (such as scripts) by the processor(s). The computing devices may also store data, which may be retrieved, stored, or modified by one or more processors in accordance with the instructions. Instructions may be stored as computing device code on a computing device-readable medium. In that regard, the terms "instructions" and "programs" may be used interchangeably herein. Instructions may also be stored in object code format for direct processing by the processor(s), or in any other computing device language including scripts or collections of independent source code modules that are interpreted on demand or compiled in advance. By way of example, the programming language may be C#, C++, JAVA or another computer programming language. Similarly, any components of the instructions or programs may be implemented in a computer scripting language, such as JavaScript, PHP, ASP, or any other computer scripting language. Furthermore, any one of these components may be implemented using a combination of computer programming languages and computer scripting languages.

Example Methods

Figure 3:
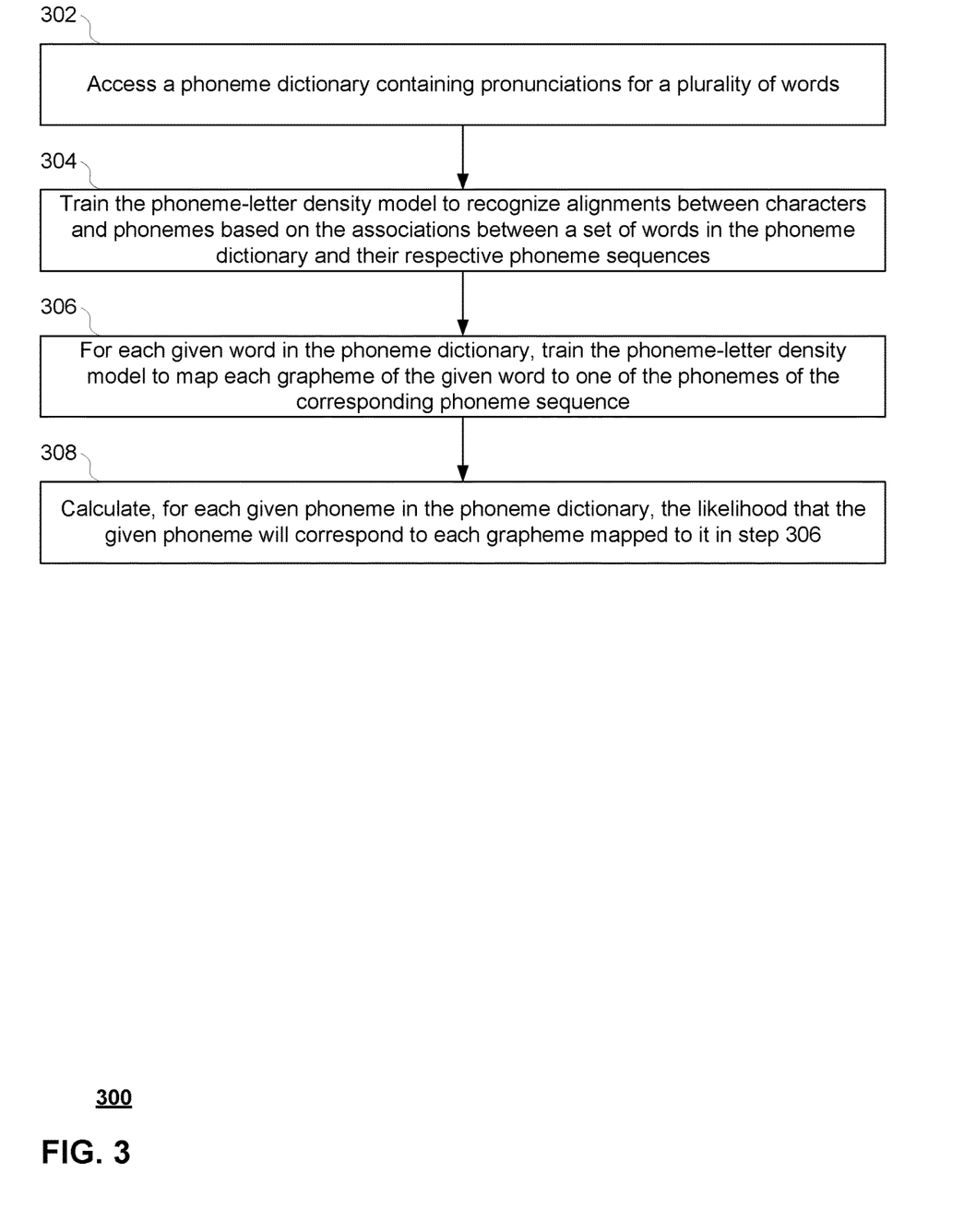
FIG. 3 is a flow diagram showing an exemplary method for generating a phoneme-letter density model, in accordance with aspects of the disclosure.

FIG. 3 depicts an exemplary method 300 for generating a phoneme-letter density model (e.g., phoneme-letter density model 112), in accordance with aspects of the disclosure.

In step 302, a processing system (e.g., processing system 102 or 202) accesses a phoneme dictionary containing pronunciations for a plurality of words. The phoneme dictionary can be any suitable data structure which correlates a word to its pronunciation, expressed in phonemes. In that regard, a phoneme is a unit of sound that distinguishes one word from another in a particular language, and phonemes may be represented using any suitable form such as the International Phonetic Alphabet ("IPA"), the Advanced Research Projects Agency's set of phonetic transcription codes known as ARPABET, etc.

In step 304, the processing system trains the phoneme-letter density model to recognize alignments between characters and phonemes based on the associations between a set of words in the phoneme dictionary and their respective phoneme sequences. This may be done for every word in the phoneme dictionary, or a suitable subset thereof. The processing system may train the phoneme-letter density model using any suitable training method.

For example, in some aspects of the technology, the processing system may train the phoneme-letter density model to correlate characters to phonemes using any suitable unsupervised method for training a translation model to correlate words in one language to words in another language. In that regard, the characters of a given word may be treated as a sentence in a first language, the phonemes of the corresponding phoneme sequence may be treated as a sentence in a second language, and the phoneme-letter density model may be trained to associate characters with phonemes (or vice versa) based on how often those characters and phonemes are found together in each example of the training set. For instance, based on "rain" corresponding to "/R/ /EY/ /N/," and "ascertain" corresponding to "/AE/ /S/ /ER/ /T/ /EY/ /N/," the phoneme-letter density model may recognize an alignment between the phoneme "/EY/" and the characters "a" and "i." In addition, as the phoneme-letter density model encounters each next example of "/EY/," it can update metrics regarding how often phoneme "/EY/" aligns with characters "a" and "i" and how often it aligns with other characters, so that it learns to predict how likely the phoneme "/EY/" is to align with characters "a" and "i" (or vice versa).

In step 306, for each given word in the phoneme dictionary, the processing system trains the phoneme-letter density model to map each grapheme of the given word to one of the phonemes of the corresponding phoneme sequence. In that regard, a grapheme may be one or more letters of a word that correspond to a given sound.

For example, if one of the words is "rain," and the phoneme dictionary lists a corresponding phoneme sequence of "/R/ /EY/ /N/," the processing system may train the phoneme-letter density model to map the grapheme "r" to the phoneme "/R/," the grapheme "ai" to the phoneme "/EY/," and the grapheme "n" to the phoneme "/N/." Here as well, the processing system may train the phoneme-letter density model using any suitable training method. Thus, in some aspects of the technology, the processing system may use the character-phoneme alignment probabilities generated during the training of step 304, and may train the phoneme-letter density model to choose the mapping that achieves the highest probability. The processing system may use dynamic programming or any other suitable method for identifying what mapping achieves the highest total probability.

In step 308, the processing system calculates, for each given phoneme in the phoneme dictionary, the likelihood that the given phoneme will correspond to each grapheme mapped to it in step 306. For example, it may be assumed that step 306 produces only 1,000 mappings which involve phoneme "/EY/," and that those mappings only involve four graphemes: grapheme "a" is mapped to phoneme "/EY/" a total of 500 times, grapheme "ay" is mapped to phoneme "/EY/" a total of 300 times, grapheme "ai" is mapped to phoneme "/EY/" a total of 150 times, and grapheme "aigh" is mapped to phoneme "/EY/" a total of 50 times. In such a case, the processing system may calculate a 50% chance that "/EY/" will correspond to grapheme "a" (500 out of 1,000), a 30% chance that "/EY/" will correspond to grapheme "ay" (300 out of 1,000), a 15% chance that "/EY/" will correspond to grapheme "ai" (150 out of 1,000), and a 5% chance that "/EY/" will correspond to grapheme "aigh" (50 out of 1,000). This example is only provided for illustrative purposes, and does not necessarily reflect all of the graphemes that may correspond to phoneme "/EY/," or the likelihood of such correspondence. Although this example shows the likelihoods being expressed as probabilities, any other suitable metric may be used. For example, in some aspects of the technology, the likelihoods calculated in step 308 may be expressed as odds.

Once the phoneme-letter density model has been generated as described above with respect to FIG. 3, the processing system may use the phoneme-letter density model to generate a list of graphemes that may correspond to any given phoneme sequence, as well as the probabilities that the identified graphemes will correspond to each individual phoneme of the given phoneme sequence. This can then be used to generate potential words (or sequences of characters) that may correspond to the given phoneme sequence.

Figure 4:
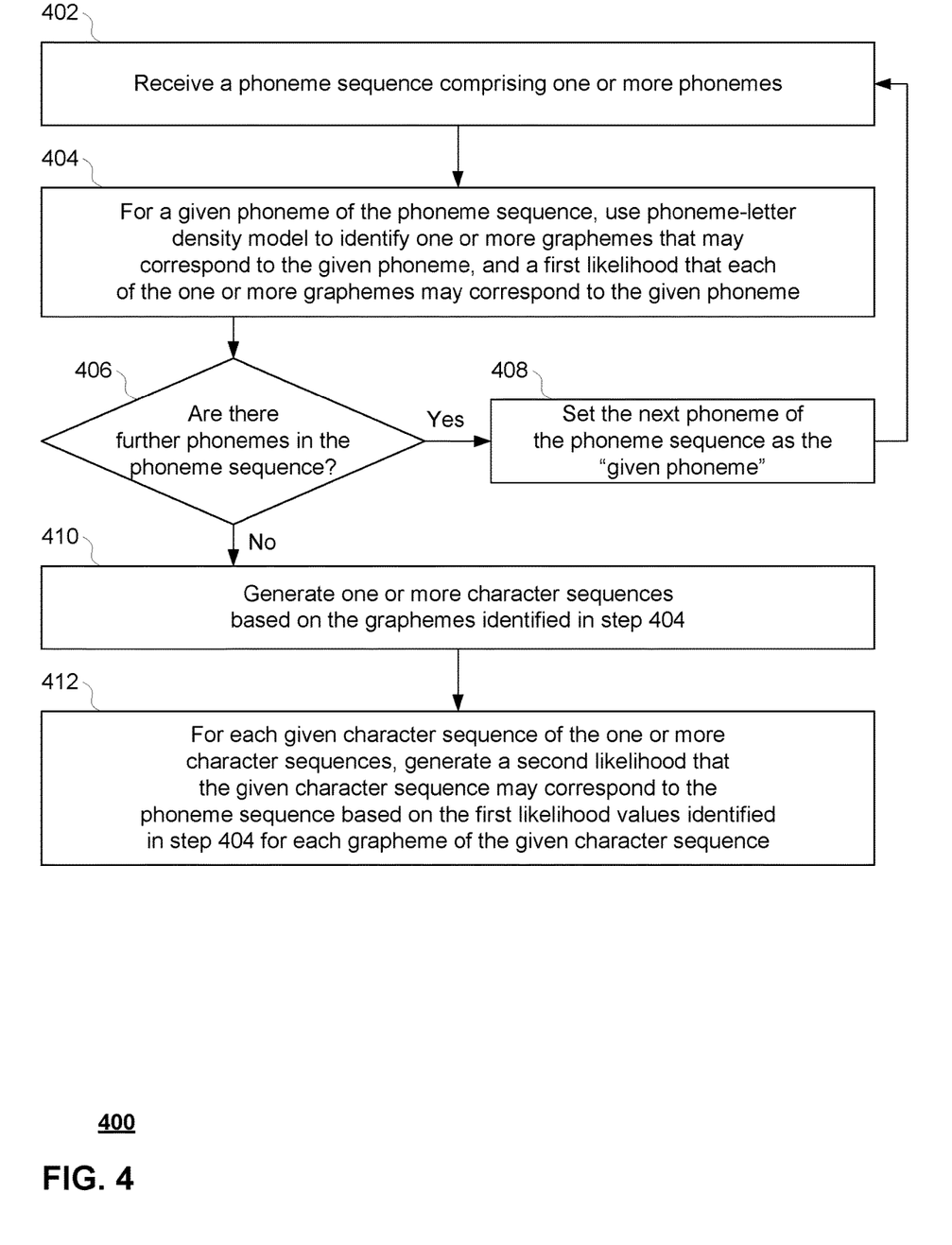
FIG. 4 is a flow diagram showing an exemplary method for identifying one or more sequences of characters that may correspond to a phoneme sequence, and their respective probabilities, using a phoneme-letter density model, in accordance with aspects of the disclosure.

In that regard, FIG. 4 depicts an exemplary method 400 for identifying one or more words (or sequences of characters) that may correspond to a phoneme sequence, and their respective probabilities, using a phoneme-letter density model (e.g., phoneme-letter density model 112), in accordance with aspects of the disclosure.

In step 402, the processing system (e.g., processing system 102 or 202) receives a phoneme sequence comprising one or more phonemes. As noted above, this phoneme sequence may be the result of processing text, or it may be the output of a speech recognition engine that identifies phonemes from audio data comprising speech. To help illustrate method 400, it will be assumed that the phoneme sequence is "/R/ /EY/ /N/."

In step 404, the processing system uses the phoneme-letter density model to identify, for a given phoneme of the phoneme sequence, one or more graphemes that may correspond to the given phoneme and a first likelihood that each of the one or more graphemes may correspond to the given phoneme. Thus, the processing system may begin with the first phoneme "/R/," and may identify grapheme "r" as being 0.83 likely to correspond to phoneme "/R/," grapheme "wr" as being 0.15 likely to correspond to phoneme "/R/," grapheme "rr" as being 0.019 likely to correspond to phoneme "/R/," and "rh" as being 0.001 likely to correspond to phoneme "/R/."

In step 406, the processing system determines whether there are further phonemes in the phoneme sequence. If so, in step 408, the processing system sets the next phoneme of the phoneme sequence as the "given phoneme," and then returns to step 404 as shown by the "yes" arrow. In the present example, the processing system will return to step 404 a second time to identify graphemes that may correspond to phoneme "/EY/," and a third time to identify graphemes that may correspond to phoneme "/N/."

Once there are no further phonemes to process in step 406, the method will move to step 410 as shown by "no" arrow. In step 410, the processing system will generate one or more character sequences based on the graphemes identified in step 404. In that regard, in some aspects of the technology, the processing system may generate a character sequence using every possible permutation of the graphemes identified for each phoneme of the phoneme sequence. Likewise, in some aspects of the technology, the processing system may determine the most likely character sequence or the top n most likely character sequences based on the first probabilities associated with each grapheme. In that regard, the likelihood of a given character sequence being an alternative pronunciation of the phoneme sequence may be calculated as described below with respect to step 412.

In step 412, for each given character sequence of the one or more character sequences, the processing system generates a second likelihood that the given character sequence may correspond to the phoneme sequence based on the first likelihood values identified in step 404 for each grapheme of the given character sequence. This second likelihood may be generated using any suitable formula. For example, in some aspects of the technology, the second likelihood may be a product of each of the first likelihood values generated in step 404 for each grapheme of the given character sequence. Likewise, in some aspects of the technology, the second likelihood may be a normalized product calculated by taking the $n^{th}$ root of the product of each of the first likelihood values generated in step 404 for each grapheme of the given character sequence, where n is the number of phonemes in the phoneme sequence. Further, in some aspects of the technology, the second likelihood may be an average of the first likelihood values generated in step 404 for each grapheme of the given character sequence.

Figure 5:
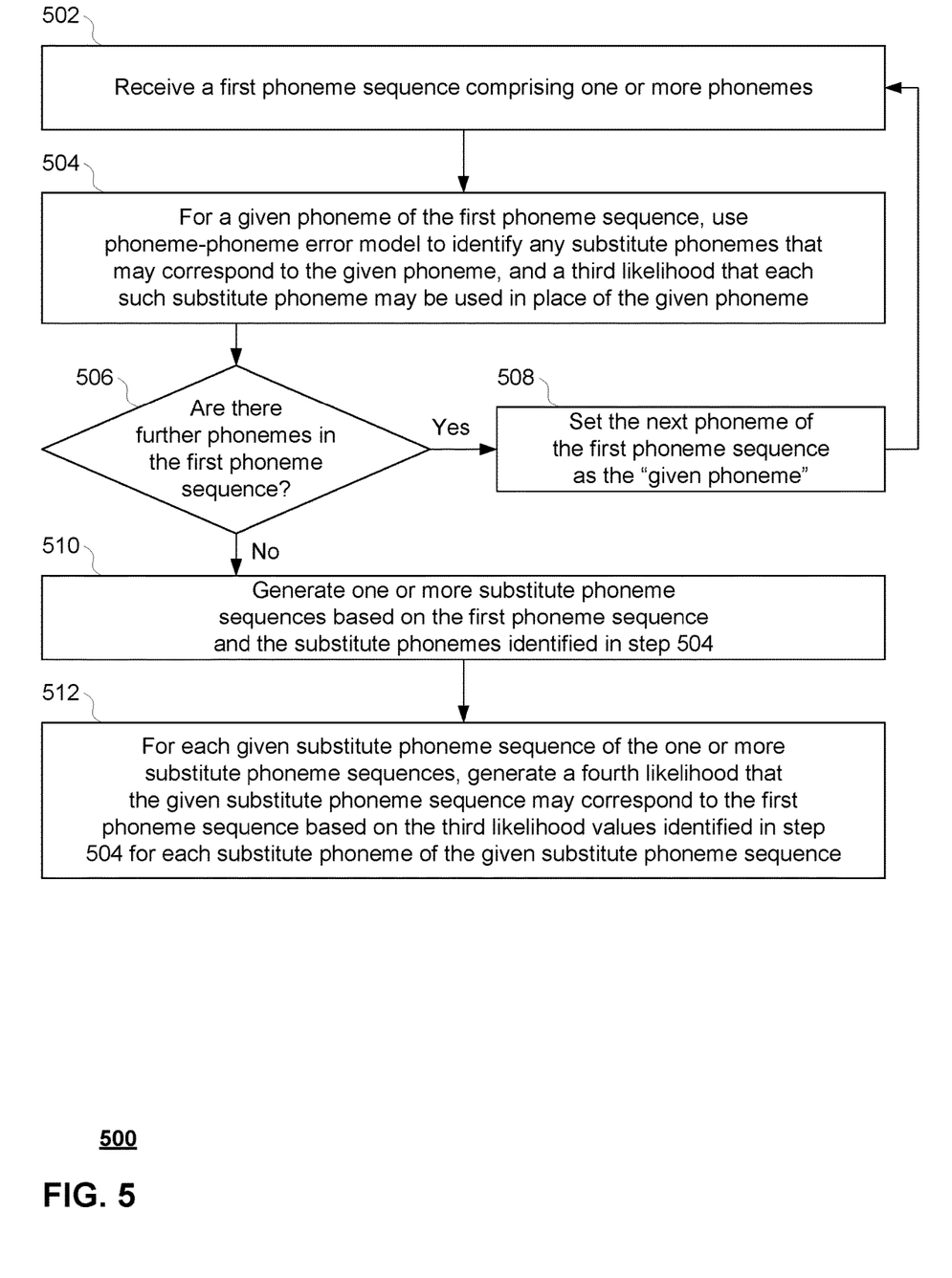
FIG. 5 is a flow diagram showing an exemplary method for generating a list of alternative phoneme sequences that may correspond to a first phoneme sequence using a phoneme-phoneme error model, and their respective probabilities, in accordance with aspects of the disclosure.

FIG. 5 depicts an exemplary method 500 for generating a list of alternative phoneme sequences that may correspond to a first phoneme sequence using a phoneme-phoneme error model (e.g., phoneme-phoneme error model 114), and their respective probabilities, in accordance with aspects of the disclosure.

In step 502, the processing system (e.g., processing system 102 or 202) receives a first phoneme sequence comprising one or more phonemes. Here as well, this phoneme sequence may be the result of processing text, or it may be the output of a speech recognition engine that identifies phonemes from audio data comprising speech. To help illustrate method 500, it will again be assumed that the phoneme sequence is "/R/ /EY/ /N/."

In step 504, the processing system uses the phoneme-phoneme error model to identify, for a given phoneme of the first phoneme sequence, any substitute phonemes that may correspond to the given phoneme and a third likelihood that each such substitute phoneme may be used in place of the given phoneme. Thus, the processing system may begin with the first phoneme "/R/," and may identify "/W/" as a substitute phoneme with a third likelihood of 0.15 as being substituted for the given phoneme "/R/." Likewise, in some cases, the phoneme-phoneme error model may reflect that there are no substitute phonemes that correspond to the given phoneme.

The phoneme-phoneme error model may be in any suitable form. In that regard, in some aspects of the technology, the phoneme-phoneme error model may be a data structure (e.g., table, matrix, database, etc.) incorporating data from linguists regarding what phonemes may be substituted for the given phoneme by speakers in a given locale, and the likelihoods thereof. Likewise, in some aspects of the technology, the phoneme-phoneme error model may be a learned model trained to identify what phonemes may be substituted for the given phoneme by speakers in a given locale. In such a case, a model may be trained using any suitable data, including a list of known phoneme substitutions (e.g., from linguists), logs of text or speech data entered by people in a given locale (e.g., search query logs, spell correction logs, logs of corrections made to text generated by speech-to-text systems, etc.), supervised training examples, etc.

In step 506, the processing system determines whether there are further phonemes in the first phoneme sequence. If so, in step 508, the processing system sets the next phoneme of the first phoneme sequence as the "given phoneme," and then returns to step 504 as shown by the "yes" arrow. In the present example, the processing system will return to step 404 a second time to identify any substitute phonemes that may correspond to phoneme "/EY/," and a third time to identify any substitute phonemes that may correspond to phoneme "/N/."

Once there are no further phonemes to process in step 506, the method will move to step 510 as shown by "no" arrow. In step 510, the processing system will generate one or more substitute phoneme sequences based on the first phoneme sequence and the substitute phonemes identified in step 504. In that regard, in some aspects of the technology, the processing system may generate a substitute phoneme sequence using every possible permutation of the substitute phonemes for each phoneme of the first phoneme sequence. Likewise, in some aspects of the technology, the processing system may determine the most likely substitute phoneme sequence or the top n most likely substitute phoneme sequences based on the third likelihood values associated with each substitute phoneme. In that regard, the likelihood of a substitute phoneme sequence being an alternative pronunciation of the first phoneme sequence may be calculated as described below with respect to step 512.

In step 512, for each given substitute phoneme sequence of the one or more substitute phoneme sequences, the processing system generates a fourth likelihood that the given substitute phoneme sequence may correspond to the first phoneme sequence based on the third likelihood values identified in step 504 for each substitute phoneme of the given substitute phoneme sequence. This fourth likelihood may be generated using any suitable formula. For example, in some aspects of the technology, the fourth likelihood may be a product of each of the third likelihood values generated in step 504 for each substitute phoneme of the given substitute phoneme sequence. Likewise, in some aspects of the technology, the fourth likelihood may be a normalized product calculated by taking the $n^{th}$ root of the product of each of the third likelihood values generated in step 504 for each substitute phoneme of the given substitute phoneme sequence, where n is the number of phonemes in the first phoneme sequence. Further, in some aspects of the technology, the fourth likelihood may be an average of the third likelihood values generated in step 504 for each substitute phoneme of the given substitute phoneme sequence.

Figure 6:
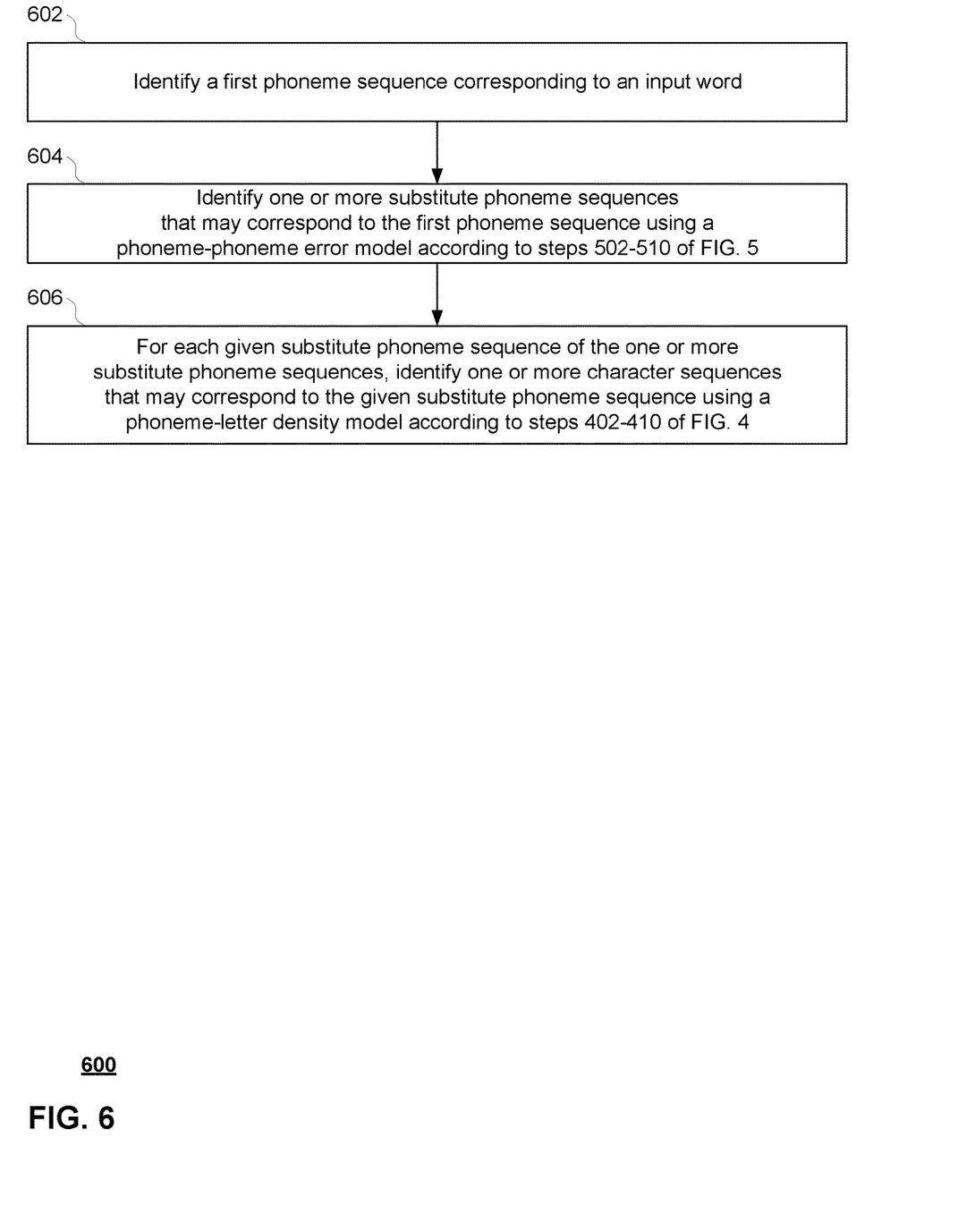
FIG. 6 is a flow diagram showing an exemplary method for generating a list of alternative character sequences that may correspond to an input word using a phoneme-letter density model and a phoneme-phoneme error model, in accordance with aspects of the disclosure.

FIG. 6 depicts an exemplary method 600 for generating a list of alternative character sequences that may correspond to an input word using a phoneme-letter density model (e.g., phoneme-letter density model 112) and a phoneme-phoneme error model (e.g., phoneme-phoneme error model 114), in accordance with aspects of the disclosure. As noted above, the input word may either be received directly from a user as text, or it may be a received from an application. For example, in some aspects of the technology, the input word may be from a transcription generated by a speech recognition engine configured to phonetically interpret audio data comprising speech.

In step 602, the processing system (e.g., processing system 102 or 202) identifies a first phoneme sequence corresponding to an input word. The processing system may do this using a phoneme-letter density model or a general phoneme dictionary. In some aspects of the technology, the first phoneme sequence may represent an expected or conventional pronunciation of the input word. For example, the first phoneme sequence may represent the most common pronunciation of the input word worldwide, the most common pronunciation of the input word in a given locale, the conventional "correct" pronunciation of the word, etc. To help illustrate method 600, it will be assumed that the input word is "design," and the first phoneme sequence is "ID/ /IH0/ /Z/ /AY1/ /N/."

In step 604, the processing system identifies one or more substitute phoneme sequences that may correspond to the first phoneme sequence using a phoneme-phoneme error model according to steps 502-510 of FIG. 5. Thus, using the exemplary first phoneme sequence of "/D/ /IH0/ /Z/ /AY1/ /N/," the processing system may identify a substitute phoneme sequence of "/D/ /IH0/ /JH/ /AY1/ /N/." This may be based, for example, on the phoneme-phoneme error model reflecting that people in a given local (e.g., parts of India) may use a "j" sound to pronounce the letter "s."

With further regard to step 604, for method 600, it is not necessary that the processing system determine a third likelihood value for each substitute phoneme included in each of the one or more substitute phoneme sequences as described above with respect to step 504. However, in cases where method 600 is combined with method 700 (as discussed below with respect to FIG. 7), it will be assumed that third likelihood values are calculated in step 604 for each identified substitute phoneme.

In step 606, for each given substitute phoneme sequence of the one or more substitute phoneme sequences, the processing system identifies one or more character sequences that may correspond to the given substitute phoneme sequence using a phoneme-letter density model according to steps 402-410 of FIG. 4. Thus, using the exemplary substitute phoneme sequence of "/D/ /IH0/ /JH/ AY1/ /N/," the processing system may identify character sequences of "dijin," "dijine," "dejine," and "dejain."

Here as well, for method 600, it is not necessary that the processing system determine a first likelihood value for each grapheme included in each of the one or more character sequences as described above with respect to step 404. However, in cases where method 600 is combined with method 700 (as described below with respect to FIG. 7), it will be assumed that first likelihood values are calculated in step 606 for each identified grapheme.

Figure 7:
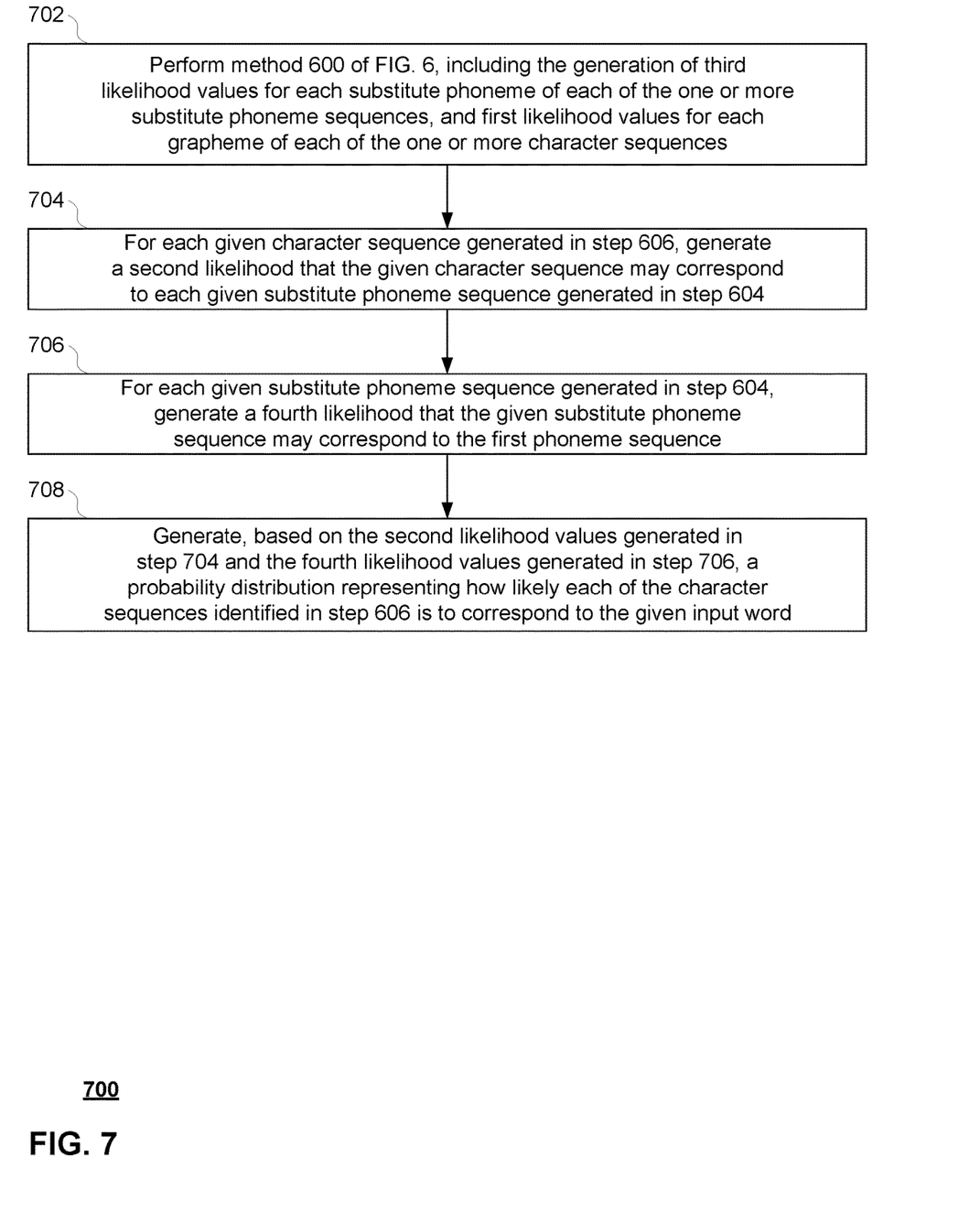
FIG. 7 is a flow diagram showing an exemplary method for generating a probability distribution representing how likely each alternative character sequence identified in FIG. 6 is to correspond to the input word using a phoneme-letter density model and a phoneme-phoneme error model, in accordance with aspects of the disclosure.

FIG. 7 depicts an exemplary method 700 for generating a probability distribution representing how likely each alternative character sequence identified in FIG. 6 is to correspond to the input word using a phoneme-letter density model (e.g., phoneme-letter density model 112) and a phoneme-phoneme error model (e.g., phoneme-phoneme error model 114), in accordance with aspects of the disclosure.

Thus, in step 702, the processing system performs method 600 of FIG. 6, including the generation of third likelihood values for each substitute phoneme of each of the one or more substitute phoneme sequences, and first likelihood values for each grapheme of each of the one or more character sequences. Thus, the processing system identifies a first phoneme sequence that corresponds to the input word (as discussed in step 602), identifies one or more substitute phoneme sequences that may correspond to the first phoneme sequence (as discussed in step 604, and incorporated steps 502-510 of FIG. 5) and identifies one or more character sequences that may correspond to each of the one or more substitute phoneme sequences (as discussed in step 606, and incorporated steps 402-410 of FIG. 4). In addition, the processing system will also generate third likelihood values for each substitute phoneme of each of the one or more substitute phoneme sequences (as discussed with respect to step 604, and incorporated step 504), and first likelihood values for each grapheme of each of the one or more character sequences (as discussed with respect to step 606, and incorporated step 404).

In step 704, for each given character sequence generated in step 606, the processing system generates a second likelihood that the given character sequence may correspond to each given substitute phoneme sequence generated in step 604. The processing system generates these second likelihood values based on the first likelihood values as discussed above with respect to steps 404 and 412 of FIG. 4. Thus, continuing with the same example discussed above with respect to method 600, the processing system would thus generate second likelihood values representing the likelihood that of character sequences "dijin," "dijine," "dejine," and "dejain" corresponds to the substitute phoneme sequence "ID/ /IH0/ /JH/ /AY1/ /N/." Although this example assumes that only one substitute phoneme sequence is identified in step 604, if multiple substitute phoneme sequences are identified, then second likelihood values will be generated based on each set of character sequences identified in step 606 and their corresponding substitute phoneme sequence.

In step 706, for each given substitute phoneme sequence generated in step 604, the processing system generates a fourth likelihood that the given substitute phoneme sequence may correspond to the first phoneme sequence. The processing system generates these fourth likelihood values based on the third likelihood values as discussed above with respect to steps 504 and 512 of FIG. 5. Thus, using the example discussed above with respect to method 600, the processing system would identify a fourth likelihood value for the substitute phoneme sequence "ID/ /IH0/ /JH/ /AY1/ /N/." In that regard, as only one phoneme differs between the exemplary first phoneme sequence of "ID/ /IH0/ /Z/ /AY1/ /N/" and the exemplary substitute phoneme sequence of "ID/ /IH0/ /JH/ /AY1/ /N/," the fourth likelihood will be based solely on the individual third likelihood value of phoneme "/JH/" being used in place of phoneme "/Z/." For example, if the phoneme-phoneme error model reflects a 0.2 likelihood that phoneme "/JH/" will be used in place of phoneme "/Z/," then the processing system may generate a fourth likelihood of 0.2 that the substitute phoneme sequence "ID/ /IH0/ /JH/ /AY1/ /N/" may correspond to the first phoneme sequence of "ID/ /IH0/ /Z/ /AY1/ /N/." However, as explained above with respect to FIG. 5, if the substitute phoneme sequence contains more than one substitution relative to the first phoneme sequence, the fourth likelihood value will be based on the third likelihood values corresponding to each substitute phoneme in the substitute phoneme sequence.

In step 708, the processing system generates, based on the second likelihood values generated in step 704 and the fourth likelihood values generated in step 706, a probability distribution representing how likely each of the character sequences identified in step 606 is to correspond to the given input word. Thus, using the example discussed above, the probability distribution would represent how likely the character sequences "dijin," "dijine," "dejine," and "dejain" are to correspond to the input word "design." The probability distribution of step 708 may be generated according to any suitable formula. For example, in some aspects of the technology, the probability distribution may be generated according to Equation 1, below:

$$P(w' \mid w) = \sum_{ph'_w} P(w' \mid ph'_w) * P(ph'_w \mid ph_w) \quad (1)$$

In Equation 1, w represents the input word, $ph_w$ represents the first phoneme sequence, $ph'_w$ represents each of the substitute phoneme sequences identified in step 604, and w' represents each of the character sequences identified in step 606. As such, the probability $P(ph'_w \mid ph_w)$ represents, for a given substitute phoneme sequence $ph'_w$, the fourth likelihood value generated in step 706 expressing the likelihood that the given substitute phoneme sequence corresponds to the first phoneme sequence $ph_w$. Likewise, the probability distribution $P(w' \mid ph'_w)$ represents, for a given substitute phoneme sequence $ph'_w$, the second likelihood values generated in step 704 expressing the likelihood that each character sequence w' corresponds to that given phoneme sequence. As shown in Equation 1, the probability distribution $P(w' \mid w)$ may be generated by summing the product of $P(w' \mid ph'_w)$ and $P(ph'_w \mid ph_w)$ for every substitute phoneme sequence $ph'_w$ generated in step 604. In this regard, the probability distribution $P(w' \mid w)$ represents the likelihood that each identified alternate spelling w' may correspond to the input word w.

As noted above, these alternate character sequences w' may reflect different ways that the word w may be pronounced in a given locale, and thus different ways that a user may attempt to spell the word w. Likewise, these alternate character sequences w' may reflect different ways that a speech-to-text application may transcribe a user's voice entry when the user is intending to say the word w. Thus, where it is assumed that input word w is the result of a mispronunciation or phonetic misspelling, the probability distribution $P(w' \mid w)$ may represent the likelihood that each alternate spelling w' may be the word that the user actually intended to input. Likewise, where it is assumed that input word w is the intended word, method 700 may be used to generate a list of alternate spellings w' that reflect different potential pronunciations or phonetic misspellings of a input word w, and a probability distribution $P(w' \mid w)$ representing how likely each such alternate spelling is to occur.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of exemplary systems and methods should be taken by way of illustration rather than by way of limitation of the subject matter defined by the claims. In addition, the provision of the examples described herein, as well as clauses phrased as "such as," "including," "comprising," and the like, should not be interpreted as limiting the subject matter of the claims to the specific examples; rather, the examples are intended to illustrate only some of the many possible embodiments. Further, the same reference numbers in different drawings can identify the same or similar elements.

The invention claimed is:

1. A computer-implemented method of generating alternative spellings of a given word, comprising:
    determining, by one or more processors of a processing system, a first phoneme sequence corresponding to the given word, the first phoneme sequence comprising a plurality of phonemes representing a first pronunciation of the given word;
    identifying, by the one or more processors, one or more substitute phonemes that may be used in place of one or more phonemes of the first phoneme sequence based on a phoneme-phoneme error model trained to identify what phonemes may be substituted for a given phoneme by speakers in a given locale;
    generating, by the one or more processors, one or more substitute phoneme sequences based on the first phoneme sequence and the identified one or more substitute phonemes; and
    for each given substitute phoneme sequence of the one or more substitute phoneme sequences, generating a given alternative spelling of the given word, comprising:
        identifying, by the one or more processors, one or more graphemes that may correspond to each given phoneme of the given substitute phoneme sequence based on a phoneme-letter density model; and
        combining, by the one or more processors, each of the identified one or more graphemes to form the given alternative spelling.

2. The method of claim 1, wherein determining the first phoneme sequence corresponding to the given word is based on a phoneme-letter density model.

3. The method of claim 1, wherein determining the first phoneme sequence corresponding to the given word is based on a phoneme dictionary.

4. The method of claim 1, wherein identifying, by the one or more processors, one or more graphemes that may correspond to each given phoneme of the given substitute phoneme sequence further comprises identifying a first likelihood value representing a likelihood that the one or more graphemes may correspond to each given phoneme.

5. The method of claim 4, wherein combining, by the one or more processors, each of the identified one or more graphemes to form the given alternative spelling further comprises generating a second likelihood value for the given alternative spelling based on the identified first likelihood values for each of the identified one or more graphemes, the second likelihood value representing a likelihood that the given alternative spelling may correspond to the first phoneme sequence.

6. The method of claim 5, further comprising identifying, by the one or more processors, a third likelihood value for each of the identified one or more substitute phonemes representing a likelihood that each of the identified one or more substitute phonemes may be used in place of a phoneme of the first phoneme sequence.

7. The method of claim 6, further comprising generating, by the one or more processors, a fourth likelihood value for each given substitute phoneme sequence of the one or more substitute phoneme sequences based on the identified third likelihood values for each identified substitute phoneme included in the given substitute phoneme sequence, the fourth likelihood value representing a likelihood that the given substitute phoneme sequence may correspond to the first phoneme sequence.

8. The method of claim 7, further comprising generating, by the one or more processors, a probability distribution representing how likely each generated alternative spelling is to correspond to the given word based on the second likelihood values and the fourth likelihood values.

9. A system for generating alternative spellings of a given word, comprising:
    a memory; and
    one or more processors coupled to the memory and configured to:
        determine a first phoneme sequence corresponding to the given word, the first phoneme sequence comprising a plurality of phonemes representing a first pronunciation of the given word;
        identify one or more substitute phonemes that may be used in place of one or more phonemes of the first phoneme sequence based on a phoneme-phoneme error model trained to identify what phonemes may be substituted for a given phoneme by speakers in a given locale;
        generate one or more substitute phoneme sequences based on the first phoneme sequence and the identified one or more substitute phonemes; and
        for each given substitute phoneme sequence of the one or more substitute phoneme sequences, generate a given alternative spelling of the given word, comprising:
            identifying one or more graphemes that may correspond to each given phoneme of the given substitute phoneme sequence based on a phoneme-letter density model; and
            combining each of the identified one or more graphemes to form the given alternative spelling.

10. The system of claim 9, wherein the one or more processors are further configured to determine the first phoneme sequence corresponding to the given word based on a phoneme-letter density model.

11. The system of claim 9, wherein the one or more processors are further configured to determine the first phoneme sequence corresponding to the given word based on a phoneme dictionary.

12. The system of claim 9, wherein identifying one or more graphemes that may correspond to each given phoneme of the given substitute phoneme sequence further comprises identifying a first likelihood value representing a likelihood that the one or more graphemes may correspond to each given phoneme.

13. The system of claim 12, wherein combining each of the identified one or more graphemes to form the given alternative spelling further comprises generating a second likelihood value for the given alternative spelling based on the identified first likelihood values for each of the identified one or more graphemes, the second likelihood value representing a likelihood that the given alternative spelling may correspond to the first phoneme sequence.

14. The system of claim 13, wherein the one or more processors are further configured to identify a third likelihood value for each of the identified one or more substitute phonemes representing a likelihood that each of the identified one or more substitute phonemes may be used in place of a phoneme of the first phoneme sequence.

15. The system of claim 14, wherein the one or more processors are further configured to generate a fourth likelihood value for each given substitute phoneme sequence of the one or more substitute phoneme sequences based on the identified third likelihood values for each identified substitute phoneme included in the given substitute phoneme sequence, the fourth likelihood value representing a likelihood that the given substitute phoneme sequence may correspond to the first phoneme sequence.

16. The system of claim 15, wherein the one or more processors are further configured to generate a probability distribution representing how likely each generated alternative spelling is to correspond to the given word based on the second likelihood values and the fourth likelihood values.

\* \* \* \* \*